US008112548B2

(12) United States Patent
Cui et al.

(10) Patent No.: US 8,112,548 B2
(45) Date of Patent: Feb. 7, 2012

(54) METHOD FOR PROVIDING A CLIP FOR VIEWING AT A REMOTE DEVICE (75) Inventors: Yingqing Lawrence Cui, San Jose, CA (US); Min Zhou, Palo Alto, CA (US); Zhaowei Jiang, San Jose, CA (US)

(73) Assignee: YAHOO! Inc., Sunnyvale, CA (US)

( * ) Notice: Subject to any disclaimer, the term of this patent is extended or adjusted under 35 U.S.C. 154(b) by 881 days.

(21) Appl. No.: 10/951,982

(22) Filed: Sep. 28, 2004

(65) Prior Publication Data
US 2006/0085731 A1 Apr. 20, 2006

(51) Int. Cl.
G06F 15/16 (2006.01)
(52) U.S. Cl. .................. 709/246; 709/248; 455/412
(58) Field of Classification Search .................. 709/246
See application file for complete search history.

(56) References Cited

U.S. PATENT DOCUMENTS

| | | | |
|---|---|---|---|
| 5,493,692 A | 2/1996 | Theimer et al. | |
| 5,758,088 A | 5/1998 | Bezaire et al. | |
| 5,915,220 A | 6/1999 | Chelliah | |
| 6,021,433 A | 2/2000 | Payne et al. | |
| 6,128,735 A | 10/2000 | Goldstein et al. | |
| 6,167,426 A | 12/2000 | Payne et al. | |
| 6,349,337 B1 | 2/2002 | Parsons, Jr. et al. | |
| 6,442,593 B1 | 8/2002 | Wang et al. | |
| 6,611,812 B2 * | 8/2003 | Hurtado et al. | 705/51 |
| 6,735,614 B1 | 5/2004 | Payne et al. | |
| 6,789,108 B1 * | 9/2004 | McMillan | 709/206 |
| 6,834,195 B2 | 12/2004 | Brandenberg et al. | |
| 6,889,062 B2 * | 5/2005 | Hamynen et al. | 455/566 |
| 6,947,451 B1 | 9/2005 | Dommety et al. | |
| 6,947,738 B2 * | 9/2005 | Skog et al. | 455/426.1 |
| 7,000,023 B2 | 2/2006 | Chiba | |
| 7,054,905 B1 * | 5/2006 | Hanna et al. | 709/206 |
| 7,159,210 B2 | 1/2007 | Griffin et al. | |

(Continued)

FOREIGN PATENT DOCUMENTS
EP 1 259 042 A2 11/2002
(Continued)

OTHER PUBLICATIONS

International Search Report and Written Opinion for PCT/USO4/38699 mailed Dec. 26, 2007.

(Continued)

*Primary Examiner* — Peter-Anthony Pappas
*Assistant Examiner* — Ninos Donabed
(74) *Attorney, Agent, or Firm* — Frommer Lawrence & Haug LLP; Jamie L. Wiegand (57) ABSTRACT A method and apparatus is directed to provide a clip of content to a remote device, such as a mobile device. The invention enables an end-user to determine content from a networked device, such as a personal computer. The determined content may include content from a webpage, graphic image, audio file, file, and the like. The determined content may be selected using a clip mechanism within a browser, or other application. The clip mechanism may provide a pop-up window, field entry, or the like, that enables entry of an identifier associated with the remote device. The clipped content may then be formatted based on a configuration of the remote device. The formatted clipped content may be transmitted to the remote device using a variety of messaging mechanisms, such as a SMS message, which includes a Universal Resource Locator (URL) to the clipped content.

19 Claims, 4 Drawing Sheets

U.S. PATENT DOCUMENTS

| | | | |
|---|---|---|---|
| 7,403,973 B2 | 7/2008 | Wilsher et al. | |
| 7,454,164 B2 | 11/2008 | Goss | |
| 7,472,162 B2 | 12/2008 | Thompson et al. | |
| 7,870,293 B2 | 1/2011 | Tso | |
| 2001/0011366 A1 | 8/2001 | Beck et al. | |
| 2001/0047403 A1* | 11/2001 | Chiba | 709/219 |
| 2001/0054087 A1 | 12/2001 | Flom et al. | |
| 2002/0019243 A1 | 2/2002 | Zhang et al. | |
| 2002/0078209 A1 | 6/2002 | Peng | |
| 2002/0137507 A1 | 9/2002 | Winkler | |
| 2002/0143856 A1* | 10/2002 | Sastri et al. | 709/202 |
| 2002/0143871 A1 | 10/2002 | Meyer et al. | |
| 2003/0069004 A1 | 4/2003 | Hamynen et al. | |
| 2003/0084165 A1 | 5/2003 | Kjellberg et al. | |
| 2003/0093311 A1 | 5/2003 | Knowlson | |
| 2003/0093459 A1 | 5/2003 | Dowling et al. | |
| 2003/0125023 A1* | 7/2003 | Fishler | 455/426 |
| 2003/0163359 A1 | 8/2003 | Kanesaka | |
| 2003/0163815 A1 | 8/2003 | Begeja et al. | |
| 2003/0182388 A1 | 9/2003 | Alexander et al. | |
| 2003/0185195 A1 | 10/2003 | Dowling et al. | |
| 2003/0185357 A1* | 10/2003 | Kaghazian | 379/93.24 |
| 2003/0187990 A1 | 10/2003 | Knauerhase et al. | |
| 2003/0191689 A1 | 10/2003 | Bosarge et al. | |
| 2003/0220125 A1* | 11/2003 | Ito et al. | 455/550.1 |
| 2003/0236917 A1* | 12/2003 | Gibbs et al. | 709/248 |
| 2004/0038670 A1* | 2/2004 | Ando et al. | 455/412.1 |
| 2004/0117459 A1 | 6/2004 | Fry | |
| 2004/0128347 A1 | 7/2004 | Mason et al. | |
| 2004/0131081 A1* | 7/2004 | Bhatia et al. | 370/466 |
| 2004/0203863 A1 | 10/2004 | Huomo | |
| 2004/0205492 A1* | 10/2004 | Newsome | 715/501.1 |
| 2005/0021616 A1 | 1/2005 | Rajahalme et al. | |
| 2005/0054446 A1 | 3/2005 | Kammler et al. | |
| 2005/0130685 A1 | 6/2005 | Jenkin | |
| 2005/0188056 A1* | 8/2005 | Kangas et al. | 709/218 |
| 2005/0278425 A1 | 12/2005 | Wilsher et al. | |
| 2006/0020596 A1 | 1/2006 | Liu et al. | |
| 2006/0031523 A1 | 2/2006 | Morris | |
| 2006/0041589 A1* | 2/2006 | Helfman et al. | 707/104.1 |
| 2006/0069671 A1* | 3/2006 | Conley et al. | 707/3 |
| 2006/0069687 A1 | 3/2006 | Cui et al. | |
| 2006/0069749 A1 | 3/2006 | Herz et al. | |
| 2006/0085731 A1* | 4/2006 | Cui et al. | 715/501.1 |
| 2006/0116146 A1* | 6/2006 | Herrod et al. | 455/515 |
| 2006/0168095 A1* | 7/2006 | Sharma et al. | 709/217 |
| 2006/0209867 A1* | 9/2006 | Schmidt et al. | 370/428 |
| 2006/0224846 A1* | 10/2006 | Amarendran et al. | 711/162 |
| 2006/0282738 A1* | 12/2006 | Sohn et al. | 714/748 |
| 2007/0088801 A1 | 4/2007 | Levkovitz et al. | |
| 2007/0282954 A1 | 12/2007 | Kim et al. | |

FOREIGN PATENT DOCUMENTS

| | | | |
|---|---|---|---|
| JP | 2001331361 A | 11/2001 | |
| JP | 2002133288 A | 5/2002 | |
| JP | 2004082354 A | 3/2004 | |
| JP | 2004102553 A | 4/2004 | |
| KR | 20040020098 | 9/2005 | |
| WO | 00-73902 A1 | 12/2000 | |
| WO | 0178319 | 10/2001 | |
| WO | 2004028119 | 4/2004 | |

OTHER PUBLICATIONS

U.S. Appl. No. 11/027,747, Official Communication mailed Oct. 17, 2007.

U.S. Appl. No. 11/027,747, Official Communication mailed on May 11, 2009.

Official Communication for European Patent Application No. 04811415.1, mailed May 23, 2011, 3 pages.

Official Communication for Chinese Patent Application No. 200480044106.6 dated Oct. 9, 2009.

Official Communication for Japanese Patent Application No. 2007-534557 mailed Jul. 27, 2009.

Official Communication for Japanese Patent Application No. 2007-534557 mailed Apr. 12, 2010.

Official Communication for Japanese Patent Application No. 2007-534557 mailed Jun. 27, 2011.

Official Communication for U.S. Appl. No. 11/027,747 mailed Apr. 10, 2008.

Official Communication for U.S. Appl. No. 11/027,747 mailed Oct. 31, 2008.

Official Communication for U.S. Appl. No. 11/027,747 mailed Jul. 7, 2009.

Official Communication for U.S. Appl. No. 11/027,747 mailed Aug. 31, 2009.

Official Communication for U.S. Appl. No. 11/027,747 mailed Feb. 26, 2010.

Official Communication for U.S. Appl. No. 11/027,747 mailed Apr. 30, 2010.

Official Communication for U.S. Appl. No. 11/027,747 mailed Feb. 28, 2011.

Official Communication for U.S. Appl. No. 11/027,747 mailed Sep. 13, 2011.

Official Communication for Chinese Patent Application No. 200780020715.1 mailed Mar. 1, 2011.

Official Communication for Japanese Patent Application No. 2009-514451 mailed Jun. 27, 2011.

Official Communication for Korean Patent Application No. 10-2008-7032036 mailed Jun. 29, 2010.

International Search Report and Written Opinion for International Patent Application No. PCT/US2007/068796 mailed Oct. 19, 2007.

International Preliminary Report on Patentability for International Patent Application No. PCT/US2007/068796 mailed Dec. 24, 2008.

Official Communication for U.S. Appl. No. 11/422,534 mailed Dec. 12, 2008.

Official Communication for U.S. Appl. No. 11/422,534 mailed May 21, 2009.

Official Communication for U.S. Appl. No. 11/422,534 mailed Jul. 27, 2009.

Official Communication for U.S. Appl. No. 11/422,534 mailed Oct. 1, 2009.

Official Communication for U.S. Appl. No. 11/422,534 mailed Apr. 6, 2010.

Official Communication for U.S. Appl. No. 11/422,534 mailed Jul. 14, 2010.

Official Communication for U.S. Appl. No. 11/422,534 mailed Sep. 15, 2010.

Official Communication for U.S. Appl. No. 11/422,534 mailed Mar. 8, 2011.

Official Communication for U.S. Appl. No. 11/422,534 mailed Oct. 4, 2011.

Official Communication for U.S. Appl. No. 11/027,747 mailed Nov. 2, 2011.

* cited by examiner

METHOD FOR PROVIDING A CLIP FOR VIEWING AT A REMOTE DEVICE

FIELD OF THE INVENTION

The invention relates generally to managing content over a network, and more particularly but not exclusively to an apparatus and method for providing content clipped from a networked source to a remote device, such as a mobile device.

BACKGROUND OF THE INVENTION

In today's computing environment, a user may employ a variety of computing devices. For example, a user may use a desktop personal computer (PC) at a fixed work place, at home, or the like. However, the same user may use a mobile computing device, such as a cellular telephone, a palm-size PC, and perhaps even a personal data assistant (PDA) during travel.

With such a variety of computing devices, there is a desire to be able to share information across the computing devices. Today, there is some limited capability to share data though a mechanism known as data synchronization. However, this mechanism often requires the two devices to be physically collated, and often networked, for the data to be transferred. It is, thus, with respect to these considerations and others that the present invention has been made.

BRIEF DESCRIPTION OF THE DRAWINGS

Non-limiting and non-exhaustive embodiments of the invention are described with reference to the following drawings. In the drawings, like reference numerals refer to like parts throughout the various figures unless otherwise specified.

For a better understanding of the invention, reference will be made to the following Detailed Description of the Invention, which is to be read in association with the accompanying drawings, wherein.

DETAILED DESCRIPTION OF THE INVENTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Briefly stated, the present invention is directed towards a method and apparatus for providing a clip of content to a remote device, such as a mobile device. The invention enables an end-user to determine content from a networked device, such as a personal computer. The determined content may include content from a webpage, such as driving instructions, graphic images, audio files, screen shots, and the like. The determined content may then be selected for delivery by using a clip mechanism associated with a browser, or other application. Selecting the content for clipping may further result in a pop-up window, field entry, or the like, that enables entry of an identifier associated with the remote device. The clipped content may then be formatted based on a configuration of the remote device. The formatted clipped content may then be transmitted to the remote device using any of a variety of asynchronous messaging protocols. For example, in one embodiment, the clipped content is transmitted using a Short Message Service (SMS) message. In another embodiment, an SMS message is employed that includes a message hook, such as a Universal Resource Locator (URL), to the clipped content.

Illustrative Operating Environment

Figure 1:
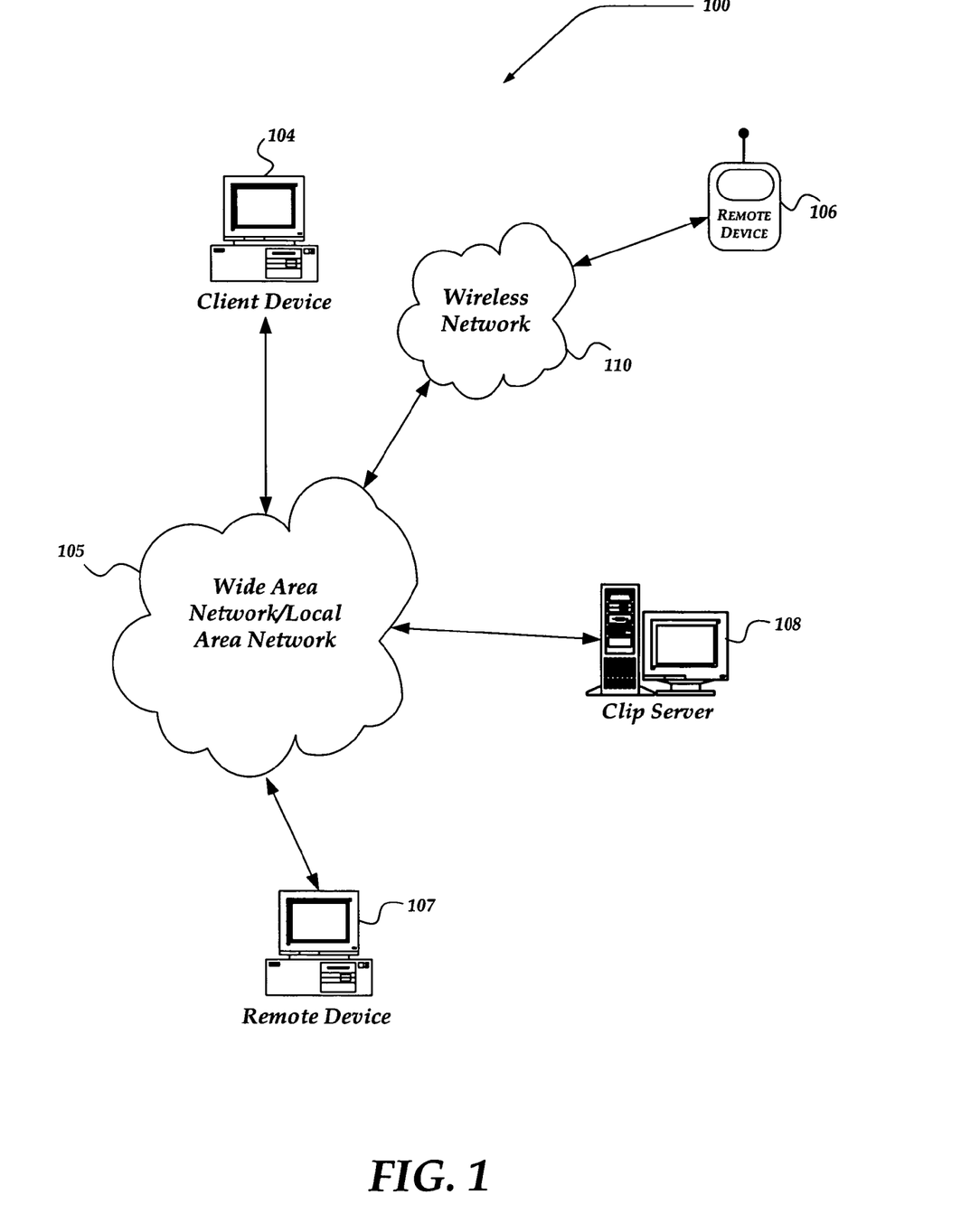
FIG. 1 shows a functional block diagram illustrating one embodiment of an environment for practicing the invention.

FIG. 1 shows components of an exemplary environment in which the invention may be practiced. Not all the components may be required to practice the invention, and variations in the arrangement and type of the components may be made without departing from the spirit or scope of the invention. As shown, system 100 of FIG. 1 includes client computer 104, local area networks ("LANs")/wide area networks ("WANs") 105, wireless network 110, clip server 108, and remote devices 106-107.

Generally, remote device 106 may include virtually any computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, wearable computers, tablet computers, integrated devices combining one or more of the preceding devices, and the like. Remote device 106 may also include other computing devices, such as personal computers, multiprocessor systems, microprocessor-based or programmable consumer electronics, network PCs, and the like. As such, remote device 106 typically ranges widely in terms of capabilities and features. For example, a cell phone may have a numeric keypad and a few lines of monochrome LCD display on which only text may be displayed. In another example, a web-enabled remote device may have a touch sensitive screen, a stylus, and several lines of color LCD display in which both text and graphics may be displayed. Moreover, the web-enabled remote device may include a browser application enabled to receive and to send wireless application protocol messages (WAP), and the like. In one embodiment, the browser application is enabled to employ a Handheld Device Markup Language (HDML), such as Wireless Markup Language (WML), WMLScript, JavaScript, and the like, to display and send a message.

Remote device 106 also may include at least one client application that is configured to receive content from another computing device. The client application may include a capability to provide and receive textual content, graphical content, audio content, and the like. The client application may further provide information that identifies itself, including a type, capability, name, identifier, and the like. The information may also indicate a content format that remote device 106 is enabled to employ. Such information may be provided in a message, or the like, sent to clip server 108, and the like.

Remote device 106 may be configured to communicate a message, such as through a Short Message Service (SMS), Multimedia Message Service (MMS), instant messaging (IM), internet relay chat (IRC), mIRC, Jabber, and the like, between another computing device, such as clip server 108, and the like. In one embodiment, the message includes a message hook, such as a URL, script, program, and the like. Remote device 106 may be further configured to employ the message hook to request access to another message, such as from clip server 108, and the like. In one embodiment, the other message is an email message. In another embodiment, the other message is an email message that is formatted in a Wireless Application Protocol (WAP) format, and the like. However, the present invention is not limited to email messages, and virtually any other message type, and the like, may be accessible through the included message hook. For example, the message may include, but not be limited to, a document, an audio file, a graphics file including a bitmap file, a jpeg file, a binary file, a video file, a File Transfer Protocol command, a compressed file, and the like.

Remote device 107 represents another embodiment of a remote device, such as a personal computer, multiprocessor system, microprocessor-based or programmable consumer electronics, network PC, and the like. Remote device 107 may operate substantially similar to remote device 106 in many ways, and different in other ways. For example, remote device 107 may represent more traditional wired devices. As such, remote device 107 may be configured to communicate with clip server 108, and other network devices, employing substantially similar mechanisms as remote device 106 for wired device implementations.

Client device 104 may include virtually any computing device capable of receiving and sending a message over a network, such as network 105, wireless network 110, and the like, to and from another computing device, such as clip server 108, remote devices 106-107, and the like. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, client device 104 may be any device that is capable of connecting using a wired or wireless communication medium such as a PDA, POCKET PC, wearable computer, and any other device that is equipped to communicate over a wired and/or wireless communication medium.

Client device 104 may include a browser application that is configured to receive and to send web pages, web-based messages, and the like. The browser application may be configured to receive and display graphics, text, multimedia, and the like, employing virtually any web based language, including Standard Generalized Markup Language (SMGL), such as HyperText Markup Language (HTML), and so forth.

Client device 104 may further include a client application that enables it to perform a variety of other actions, including, communicating a message, such as through a Short Message Service (SMS), Multimedia Message Service (MMS), instant messaging (IM), internet relay chat (IRC), mIRC, Jabber, and the like, between itself and another computing device. The browser application, and/or another application, such as the client application, a plug-in application, and the like, may enable client device 104 to select content to be clipped, reformatted, and delivered to a remote device, such as remote devices 106-107. In one embodiment, client device 104 may be configured to perform actions such as described below in conjunction with FIG. 3 to select, and clip the content for delivery to the remote device.

Wireless network 110 is configured to couple remote device 106 and its components with WAN/LAN 102. Wireless network 110 may include any of a variety of wireless sub-networks that may further overlay stand-alone ad-hoc networks, and the like, to provide an infrastructure-oriented connection for remote device 106. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as remote device 106 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between remote device 106 and another computing device, network, and the like.

Network 105 is configured to couple clip server 108 and its components with other computing devices, including remote device 107, client computer 104, clip server 108, and through wireless network 110 to remote device 106. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between clip server 108 and another computing device.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of clip server 108 is described in more detail below in conjunction with FIG. 2. Briefly, however, clip server 108 may include any computing device capable of connecting to network 105 to enable a user of client device 104 to clip content for delivery to a remote device. Devices that may operate as clip server 108 include personal computers desktop computers, multiprocessor systems, microprocessor-based or programmable consumer electronics, network PCs, servers, and the like. Clip server 108 may employ process 400 of FIG. 4 to perform clip services between client device 104 and the identified remote device.

Illustrative Server Environment

Figure 2:
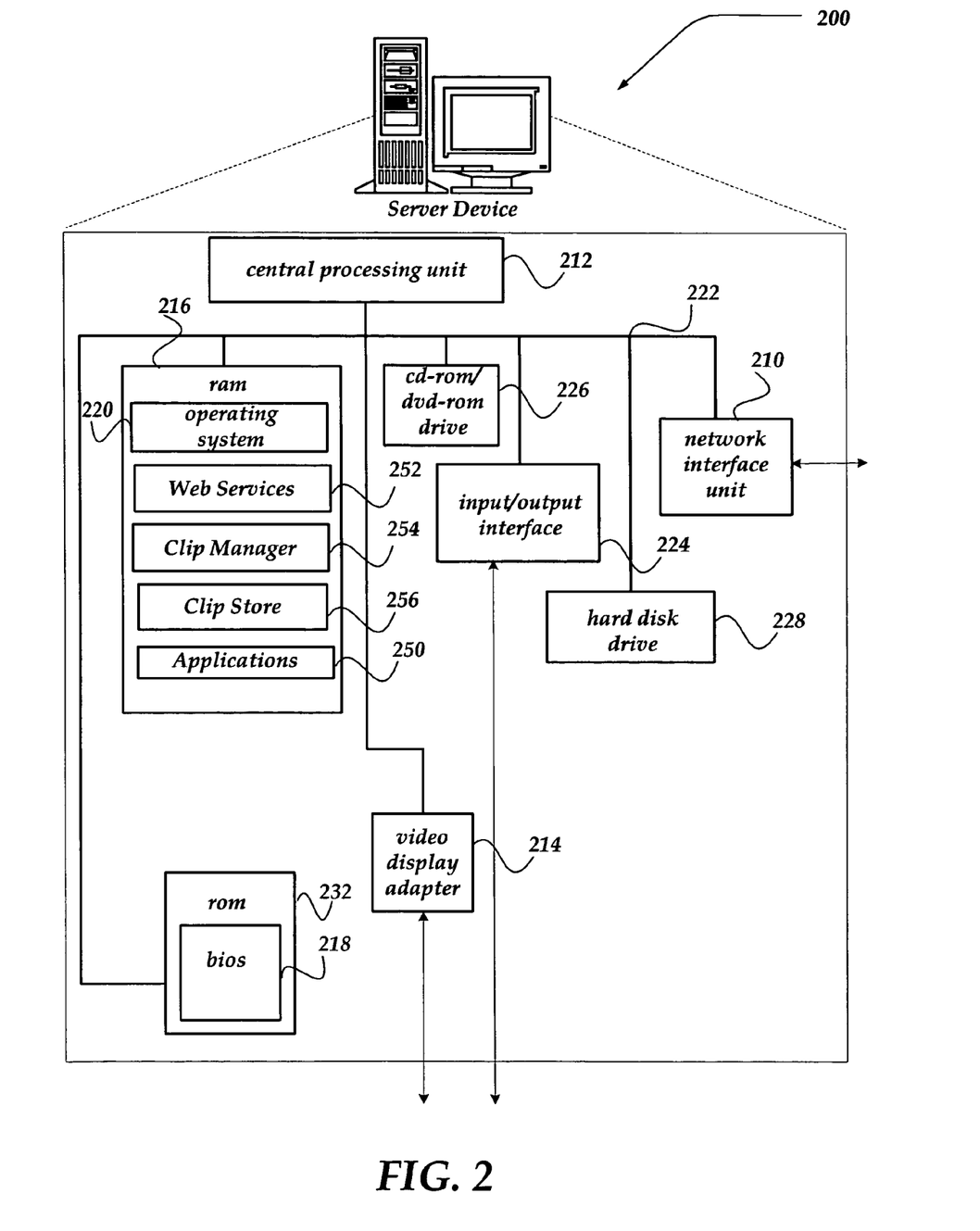
FIG. 2 shows one embodiment of a client device that may be employed in a system implementing the invention.

FIG. 2 shows one embodiment of a server device, according to one embodiment of the invention. Server device 200 may include many more components than those shown. The components shown, however, are sufficient to disclose an illustrative embodiment for practicing the invention. Server device 200 may, for example, be employed to operate as clip server 108 of FIG. 1.

Server device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of server 102. Any general-purpose operating system may be employed. Basic input/output system ("BIOS") 218 is also provided for controlling the low-level operation of server device 200. As illustrated in FIG. 2, server device 200 also can communicate with the Internet, or some other communications network, such as network 105 and wireless network 110 in FIG. 1, via network interface unit 210, which is constructed for use with various communication protocols including TCP/IP protocol, UDP/IP protocol, and the like. Network interface unit 210 is sometimes known as a transceiver, transceiving device, network interface card (NIC), and the like.

Server device 200 may also include an SMTP handler application for transmitting and receiving email. Server device 200 may also include an HTTP handler application for receiving and handing HTTP requests, and an HTTPS handler application for handling secure connections. The HTTPS handler application may initiate communication with an external application in a secure fashion.

Server device 200 also includes input/output interface 224 for communicating with external devices, such as a mouse, keyboard, scanner, or other input devices not shown in FIG. 2. Likewise, server device 200 may further include additional mass storage facilities such as CD-ROM/DVD-ROM drive 226 and hard disk drive 228. Hard disk drive 228 is utilized by server device 200 to store, among other things, application programs, and the like.

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs include email programs, schedulers, calendars, security services, transcoders, database programs, word processing programs, spreadsheet programs, and so forth. Mass storage may further include applications such as web services 252, clip manager 254, and clip store 256.

Web services 252 is configured to manage requests from a client device's browser application and deliver web-based content in response. As such, web services 252 may include such applications as Apache, Internet Information Server (IIS), Netscape, National Center for Supercomputing Applications (NCSA), and the like. In one embodiment, web services 252 communicates with the client's browser application employing HTTP. However, web services may also execute server-side scripts (CGI scripts, JSPs, ASPs, and so forth) that provide functions such as database searching, e-commerce, and the like. In one embodiment, web services 252 interacts with clip manager 254 to enable clipping of content provided to the client's browser for delivery to another computing device. In one embodiment, web services 252 may enable a clip icon, drop-down menu, pop-up menu, or similar clip mechanism that allows an end-user to select the content for delivery. Web services 252 may receive the clip mechanism from clip manager 254. The clip mechanism may further enable the end-user to provide an identifier that uniquely indicates a remote device to which the clipped content is to be delivered.

Clip manager 254 is configured to receive the clipped content from web services 252, along with the remote device's identifier. Clip manager 254 may employ the identifier to determine a format that is compatible with the identified remote device, and if necessary, clip manager 254 may reformat the clipped content into a compatible format. Clip manager 254 may further employ the remote device's identifier to deliver the reformatted clipped content to the remote device. In one embodiment, clip manager 254 may send the reformatted clipped content to the remote device using any of a variety of message protocols, including SMS. In another embodiment, clip manager 254 may send a message to the remote device, wherein the message includes a hook, or similar mechanism, that indicates where the clipped content may be obtained. For example, in one embodiment, the hook may include a URL that further includes a storage location identifier for the clipped content on a server. When the end user of the remote device receives the message and selects the hook, the clipped content is accessed using the storage location identifier, and displayed employing the remote device's browser, or other appropriate application. For example, where the clipped content includes text, such as driving instructions, webpage content, and the like, the appropriate application might include the client's browser, word processor, or the like. In any event, clip manager 254 may, in one embodiment, employ process 400 of FIG. 4 and interact with process 300 of FIG. 3.

Clip store 250 includes virtually any storage mechanism, including a file, folder, database, and the like, for storing and managing clipped content. In one embodiment, the clipped content is organized using information associated with the remote device's identifier. However, the clipped content may also be readily accessed by the client device that clipped the content. As such, the clipped content may include information associated with the client device, the end-user of the client device, and the like. For example, in one embodiment, the end-user of the client device has an account identifier that enables the client device to store and retrieve the clipped content from clip store 250.

Although illustrated in FIG. 2 as distinct components in server device 200, web services 252, clip manager 254, and clip store 256 may be arranged, combined, and the like, in any of a variety of ways, without departing from the scope of the present invention. For example, web services 252 and clip manager 254 may be arranged as a single component. Moreover, web services 252, clip manager 254, and clip store 256 may reside in one or more separate computing devices, substantially similar to server device 200.

Generalized Operation

Figure 3:
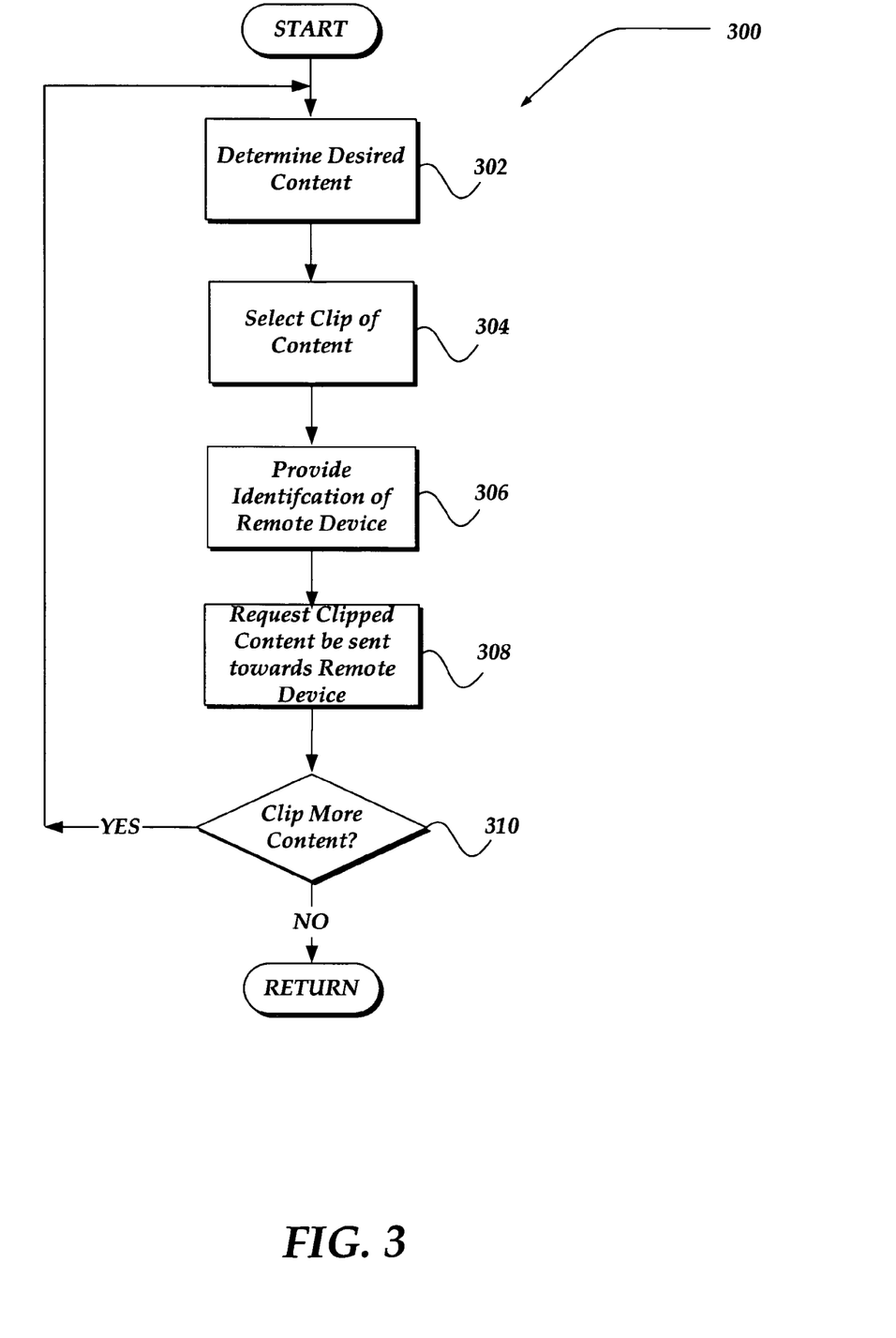
FIG. 3 illustrates a logical flow diagram generally showing one embodiment of a process for selecting clip content for delivery to a remote device.

The operation of certain aspects of the present invention will now be described with respect to FIG. 3. FIG. 3 illustrates a logical flow diagram generally showing one embodiment of a process for selecting clip content for delivery to a remote device. Process 300 of FIG. 3 may, for example, represent an interaction between a client device, such as client device 104, and a server device, such as clip server 108.

Process 300 begins, after a start block, at block 302, after an end-user employing a computing device, such as client device 104 of FIG. 1, accesses content over a network. In one embodiment, the content is accessed by the client device using a web browser.

As an illustrative example, an end-user may wish to provide to a remote device a set of driving directions to a particular point of interest, although the end-user's client computing device is not currently networked with the remote device. The end-user may employ the client's web browser to access a website on a server, and request the desired driving directions. Clearly, however, the invention is not limited to displayed content, and other content may be determined, including audio files, movies, graphical files, binary files, and the like.

Processing then flows to block 304, where the end-user may employ a variety of clip mechanisms to select and clip the desired content. The clip mechanisms employed may include, for example, a button on a toolbar such as a browser toolbar, a link accessible through the browser, a displayed icon, an executable application, script, and the like. In one embodiment, the clip mechanism may reside on a server and be displayed for use through the client's browser. Thus, in one embodiment, no permanent modifications, or additional permanent applications need reside on the client device. In any event, the end-user might select the clip mechanism, which in turn, captures the determined content. In the present example, the clip mechanism clips the displayed driving instructions.

Process 300 continues to block 306, where the clip mechanism, or related application, requests the end-user enter an identification of the destination. In our example, the end-user may desire to provide the driving instructions to a mobile device, or similar remote device. In this example then, the identifier might include a phone number, Mobile Identification Number (MIN), an electronic serial number (ESN), or similar identifier to uniquely identify the remote device for which delivery of the clipped content is intended. In one embodiment, the identifier is an IP address associated with the remote device.

Process 300 flows to block 308, where the end-user then employs the clip mechanism, or a similar mechanism, to request that the clipped content be delivered to the identified destination. Processing continues next to decision block 310 where a determination is made whether more content is to be clipped for delivery. If no additional content is to be clipped, process 300 returns to a calling process to perform other actions. If additional content is to be clipped, process 300 loops back to block 302 and to perform substantially as described above.

Figure 4:
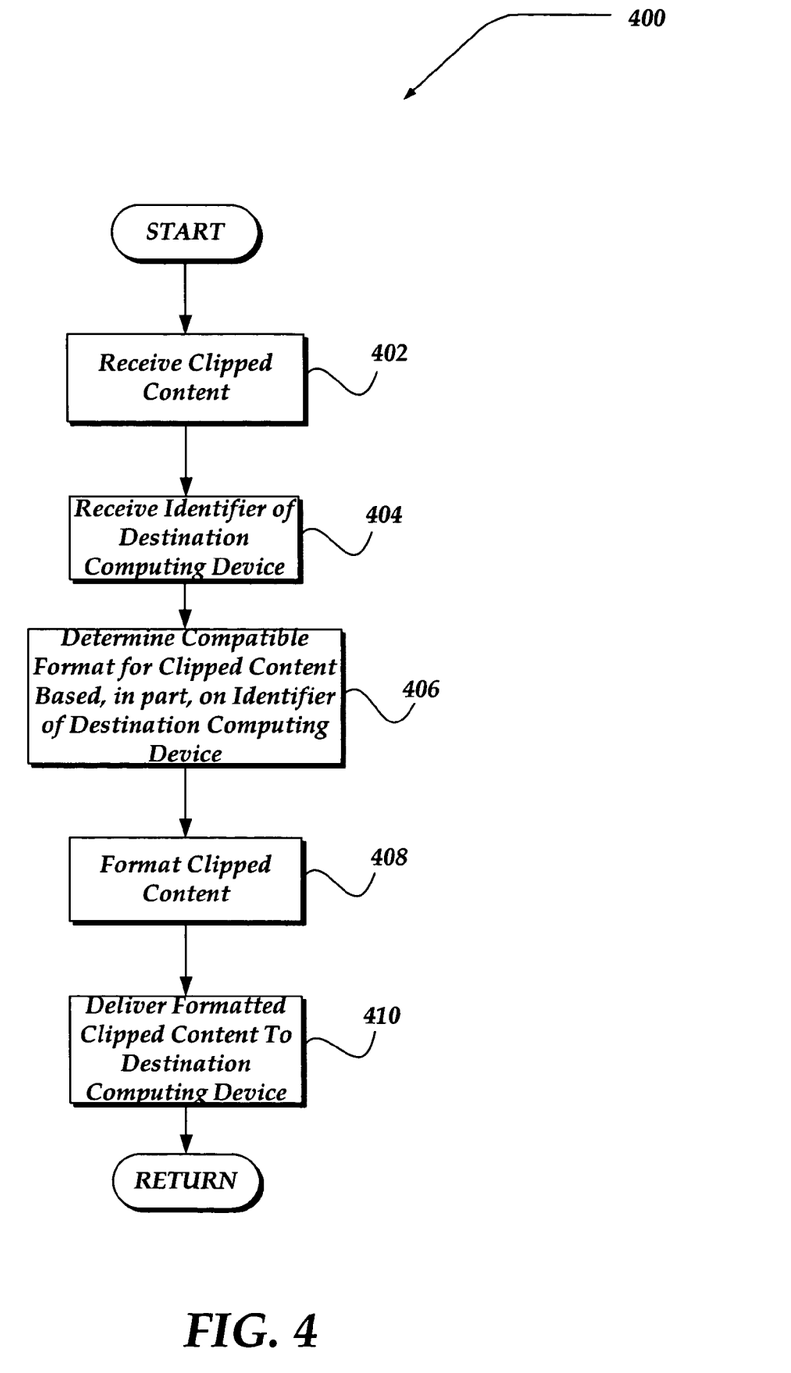
FIG. 4 illustrates a logical flow diagram generally showing one embodiment of a process for managing delivery of clipped content to the remote device, in accordance with the present invention.

FIG. 4 illustrates a logical flow diagram generally showing one embodiment of a process for managing delivery of clipped content to the remote device, in accordance with the present invention. Process 400 of FIG. 4 may, for example, be implemented on a server, such as clip server 108 of FIG. 1.

Process 400 begins, after a start block, at block 402, where content that has been clipped for delivery to another computing device is received. The other computing device may, for example, include remote devices 106-107 of FIG. 1. Moreover, the content may have been clipped using process 300 of FIG. 3 above. Processing then continues to block 404, where an identifier associated with the computing device to receive the clipped content is received.

Processing continues next to block 406 where the identifier may be employed to determine a characteristic of the destination computing device. In one embodiment, the identifier may be used to search a data base, text, file, and the like, to determine a content format that is compatible with the destination computing device. In another embodiment, the identifier may be employed to send a query to the destination computing device to ascertain a compatible format for the clipped content. Upon determination of a compatible format, processing proceeds to block 408 where the clipped content may be formatted using the compatible format. In our present driving instruction example, the clipped content may be formatted into an SMS message. In another embodiment, the clipped content may be formatted for display in a browser format using HTML, WML, WMLScript, JavaScript, and the like. Similarly, the clipped content may be formatted using a compatible audio format, graphical format, or other format as appropriate for the clipped content type and the destination computing device.

In one embodiment, a message hook, such as a URL, script, program, and the like, may be inserted into a messaging mechanism, such as an SMS message, where the message hook includes a storage location address, or the like, associated with a stored location of the clipped content. When the SMS message is received by the destination computing device, the message hook may be selected triggering access the clipped content.

The invention, however, is not constrained to these mechanisms, and virtually any messaging mechanism may be selected to package the formatted clipped content for delivery. For example, the clipped content may be delivered through email, HTTP, IM, MMS, and the like.

Process 400 continues next to block 410, where the formatted clipped content is delivered to destination computing device using the selected messaging mechanism. Upon delivery of the clipped content, process 400 returns to a calling process to perform other actions.

It will be understood that each block of the flowchart illustrations discussed above, and combinations of blocks in the flowchart illustrations above, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor, provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A server for communicating content over a network, comprising:
   a transceiver for receiving and sending content of another server over the network; wherein the server is configured to perform actions, including:
      sending content received from the other server to a first computing device, wherein the content includes a script-based clipping mechanism for selecting and clipping the content, and wherein the content and a means for activating the script-based clipping mechanism are displayed by a browser at the first computing device;
      receiving a user's selection of clipped content from the first computing device, wherein the clipped content was generated using the script-based clipping mechanism;
      receiving from the first computing device a device identifier identifying at least one particular characteristic of a second computing device, wherein the first computing device and the second computing device are currently uncoupled;
      determining a format for the clipped content that is compatible with an application on the second computing device, wherein the format is determined using the device identifier having at least one particular characteristic identified for the second computing device to query the second computing device to determine the format;
      formatting the clipped content to the determined format, determined based at least on a result of the query; and
      transmitting the clipped content to the second computing device, wherein the clipped content is provided in the determined format in a message, and wherein the clipped content further comprises providing a message hook to the second computing device, the message hook comprising at least one of a Uniform Resource Locator (URL), a script, or an executable program, and the message hook further comprises an address of a storage location address at which the clipped content is stored prior to enabling access to the clipped content by the second computing device.

2. The server of claim 1, wherein the second computing device is a mobile device.

3. The server of claim 1, wherein enabling access to the clipped content further comprises employing at least one of a Short Message Service (SMS), Multimedia Message Service (MMS), instant messaging (IM), interne relay chat (IRC), mIRe, Jabber, or HTTP protocol.

4. The server of claim 1, wherein formatting the clipped content further comprises formatting the clipped content using at least one of a Standard Generalized Markup Language (SMGL), Handheld Device Markup Language (HDML), Wireless Markup Language (WML) Script, Wireless Application Protocol (WAP), or JavaScript.

5. The server of claim 1, wherein enabling access to the clipped content further comprises sending an SMS message to the second computing device.

6. The server of claim 1, wherein the content is clipped from a webpage.

7. The server of claim 1, wherein enabling access to the clipped content further comprises employing an asynchronous messaging protocol.

8. The server of claim 1, wherein sending content further comprises providing at least one of a toolbar button, an icon, link, a drop-down menu, a popup menu, and an application for use in selecting or clipping the content.

9. A method of communicating content over a network, comprising:
   at a first server, enabling providing content from a second server to a first computing device, wherein the content includes a script-based clipping mechanism for selecting and clipping the content, and wherein the content and a means for activating the script-based clipping mechanism are displayed by a browser at the first computing device;
   at the first server, receiving a selection of clipped content from the first computing device, wherein the clipped content was generated using the script-based clipping mechanism;
   at the first server, receiving a device identifier associated with a second computing device from the first computing device, wherein the first computing device and the second computing device are currently uncoupled, and wherein the device identifier identifies at least one particular characteristic of the second computing device;
   determining a format for the clipped content that is compatible with the second computing device, wherein the format is determined using at least the device identifier having at least one particular characteristic identified for the second computing device to query the second computing device to determine the format;
   formatting the clipped content to the determined format, determined based at least on a result of the query; and
   at the first server, transmitting the clipped content to the second computing device, wherein the clipped content is provided in the determined format in a message, the clipped content further comprises providing a message hook to the second computing device, the message hook comprising at least one of a Uniform Resource Locator (URL), a script, or an executable program, and the message hook further comprises an address of a storage location address at which the clipped content is stored prior to enabling access to the clipped content by the second computing device.

10. The method of claim 9, wherein the content further comprises at least one of an audio file, a graphics file, a binary file, or a text file.

11. The method of claim 9, wherein enabling access to the clipped content further comprises employing at least one of a Short Message Service (SMS), Multimedia Message Service (MMS), instant messaging (IM), interne relay chat (IRC), mIRC, Jabber, or HTTP protocol.

12. The method of claim 9, wherein enabling access to the clipped content further comprises sending an SMS message to the second computing device.

13. The method of claim 9, wherein providing content further comprises providing content using a browser application.

14. The method of claim 9, wherein clipping a selection further comprises providing at least one of a toolbar button, an icon, link, a drop-down menu, a popup menu, or an application for use in clipping the content.

15. A non-transitory computer readable storage medium comprising instructions for causing a computer to perform:
    sending content received from a server to a first computing device, wherein the content includes a script-based clipping mechanism for selecting and clipping the content, and wherein the content and a means for activating the script-based clipping mechanism are displayed by a browser at the first computing device;
    enabling a clipping of a selection of content at the first computing device, wherein the clipped content was generated using the script-based clipping mechanism;
    receiving from the first computing device a device identifier associated with the second computing device, wherein the first computing device and the second computing device are currently uncoupled, and wherein the device identifier identifies at least one particular characteristic of the second computing device;
    formatting the clipped content to be in a format that is readable by the second computing device based on the device identifier having at least one particular characteristic identified for the second computing device, wherein the format is determined using at least the device identifier to query the second computing device to determine the format; and
    transmitting the clipped content to the second computing device, wherein the clipped content is provided in the determined format in a message, the clipped content further comprises providing a message hook to the second computing device, the message hook comprising at least one of a Uniform Resource Locator (URL), a script, or an executable program, and the message hook further comprises an address of a storage location address at which the clipped content is stored prior to enabling access to the clipped content by the second computing device.

16. The medium of claim 15, wherein formatting the clipped content further comprises sending a message to the second computing device to ascertain a format capability.

17. The medium of claim 15, wherein the second computing device further comprises a mobile device.

18. The medium of claim 15, wherein enabling access to the formatted clipped content further comprises sending the formatted clipped content to the second computing device in an SMS message.

19. An apparatus for communicating content over a network, comprising:
    a memory for storing data and instructions;
    a processor for executing instructions that enables actions;
    means for sending content received from a server to a first computing device, wherein the content includes a script-based clipping mechanism for selecting and clipping the content, and wherein the content and a means for activating the script-based clipping mechanism are displayed by a browser at the first computing device;
    means for enabling clipping of the content within a browser at a first computing device, wherein the clipped content was generated using the script-based clipping mechanism;
    means for employing a device identifier for determining at least one particular characteristic of a second computing device based on information provided from the first computing device, wherein the first computing device and the second computing device are currently uncoupled, wherein the content is received from the server and displayed by a browser at the first computing device, and wherein the browser includes a mechanism that enables selection and clipping of content of the server that is subsequently provided to the second computing device;
    means for formatting the clipped content to be in a format that is readable by the second computing device based on the determined at least one particular characteristic for the second computing device, wherein the format is determined using at least the device identifier to query the second computing device to determine the format; and
    means for providing the formatted clipped content to the second computing device wherein the clipped content is provided in the determined format in a message based on the at least one particular characteristic for the second computing device, the clipped content further comprises providing a message hook to the second computing device, the message hook comprising at least one of a Uniform Resource Locator (URL), a script, or an executable program, and the message hook further comprises an address of a storage location address at which the clipped content is stored prior to enabling access to the clipped content by the second computing device.

* * * * *

UNITED STATES PATENT AND TRADEMARK OFFICE
CERTIFICATE OF CORRECTION

PATENT NO.         : 8,112,548 B2
APPLICATION NO.    : 10/951982
DATED              : February 7, 2012
INVENTOR(S)        : Yingqing Lawrence Cui et al.

It is certified that error appears in the above-identified patent and that said Letters Patent is hereby corrected as shown below:

In column 10, line 4, in Claim 3, delete "interne" and insert -- internet --, therefor.

In column 10, line 5, in Claim 3, delete "mIRe," and insert -- mIRC, --, therefor.

In column 11, line 1, in Claim 11, delete "interne" and insert -- internet --, therefor.

Signed and Sealed this
Twenty-sixth Day of June, 2012

David J. Kappos
*Director of the United States Patent and Trademark Office*